(12) United States Patent
Huang

(10) Patent No.: US 8,079,108 B2
(45) Date of Patent: Dec. 20, 2011

(54) CLEANING SYSTEM

(75) Inventor: Chien-Feng Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 419 days.

(21) Appl. No.: 12/429,178

(22) Filed: Apr. 23, 2009

(65) Prior Publication Data

US 2009/0311360 A1    Dec. 17, 2009

(30) Foreign Application Priority Data

Jun. 11, 2008   (CN) .......................... 2008 1 0302099

(51) Int. Cl.
    *B08B 9/027* (2006.01)
(52) U.S. Cl. ............... 15/104.05; 15/104.02; 15/104.16; 239/114; 239/123; 425/229; 425/DIG. 51
(58) Field of Classification Search ............... 15/104.02, 15/104.03, 104.05, 104.16; 239/114, 123, 239/106, 107; 425/227, 229, DIG. 51
See application file for complete search history.

(56) References Cited

U.S. PATENT DOCUMENTS

| | | | | |
|---|---|---|---|---|
| 1,275,571 A | * | 8/1918 | Leslie | 15/406 |
| 2,812,531 A | * | 11/1957 | Ashley | 15/373 |
| 4,872,234 A | * | 10/1989 | Wonnacott | 15/104.16 |
| 5,840,128 A | * | 11/1998 | Imig | 134/8 |

* cited by examiner

*Primary Examiner* — Mark Spisich
(74) *Attorney, Agent, or Firm* — Altis Law Group, Inc.

(57) ABSTRACT

A cleaning system used for cleaning up plastic in a nozzle of a molding apparatus, the nozzle including a nozzle opening and a through hole connected with the nozzle opening, the plastic being received in the through hole. The cleaning system includes a bottom fixing sleeve, a top guiding sleeve and a knocking stick. The bottom fixing sleeve is configured for securely fixing the nozzle. The top guiding sleeve is configured for coupling with the bottom fixing sleeve, and the top guiding sleeve includes a guiding hole defined therein. The knocking stick is movable along the guiding hole of the top guiding sleeve such that the knocking stick strikes the plastic in a direction along the central axis of the through hole of the nozzle.

12 Claims, 5 Drawing Sheets

CLEANING SYSTEM

BACKGROUND

1. Technical Field

The present invention relates to molding apparatuses, and particularly to a cleaning system for cleaning the nozzle of a molding apparatus.

2. Description of Related Art

Molding apparatuses are widely used for manufacturing optical components, such as light guide plates, lenses, etc.

Referring to FIG. 5, a nozzle 10, of an injection molding machine, can sometimes be blocked by the material being molded such as plastic material 12. The plastic material 12 may be lodged during the injection process and will adhere to the inner wall 14 of the nozzle 10 while cooling down, making it difficult to clean the nozzle. Usually a dowel 16 can be used for cleaning up the plastic material 12. However, the nozzle 10 may be easily damaged by the dowel 16.

Therefore, a new cleaning system is desired to overcome the problem described above.

BRIEF DESCRIPTION OF THE DRAWINGS

Many aspects of the present cleaning system can be better understood with reference to the following drawings. The components in the drawings are not necessarily to scale, the emphasis instead being placed upon clearly illustrating the principles of the present cleaning system. Moreover, in the drawings, like reference numerals designate corresponding parts throughout the several views.

DETAILED DESCRIPTION

Reference will now be made to the drawings to describe in detail of the exemplary embodiments of the cleaning system.

Figure 1:
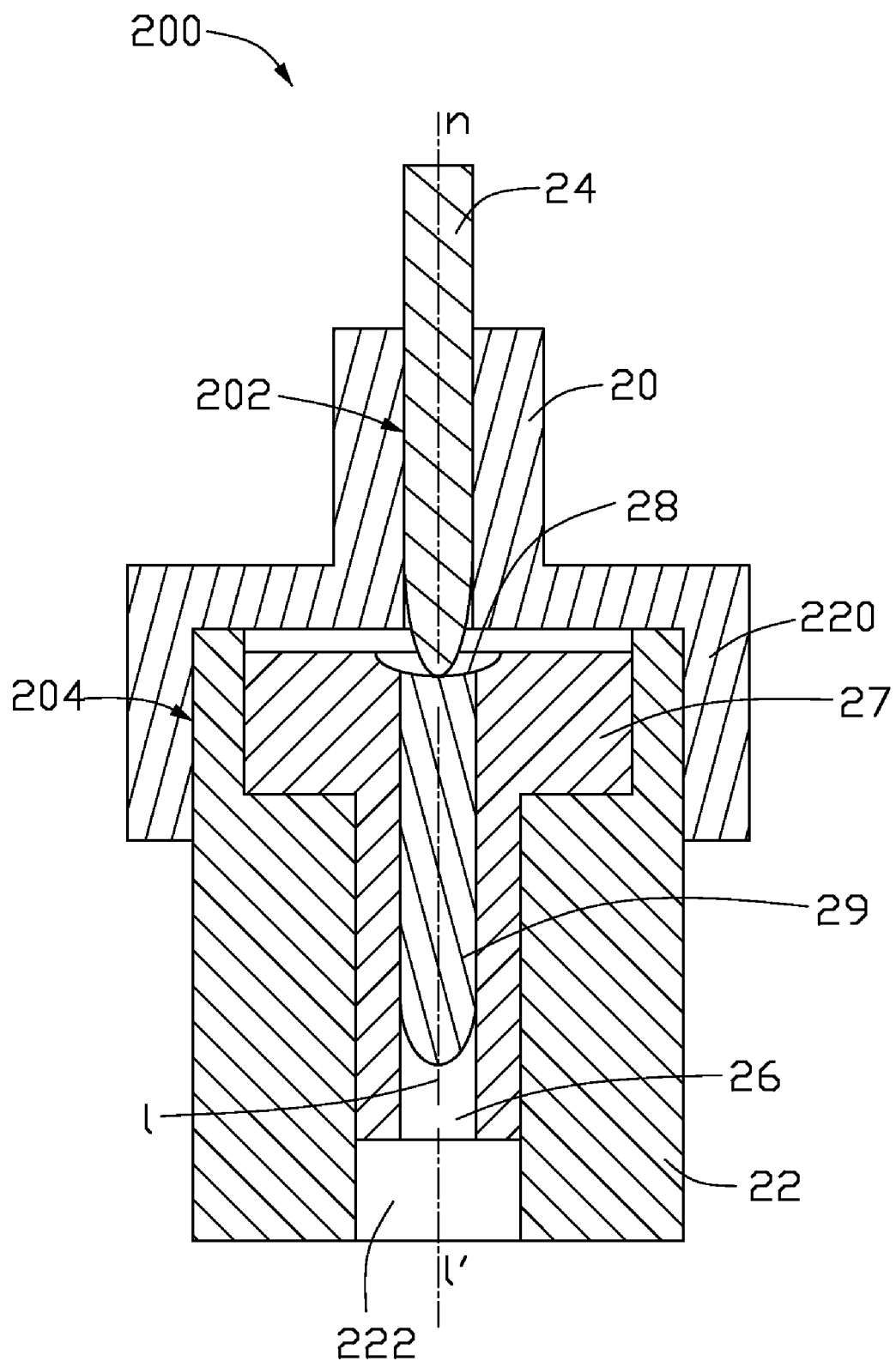
FIG. 1 is a cross-sectional view of a cleaning system according to a first embodiment.

Referring to FIG. 1, a cleaning system 200, in accordance with a first embodiment, includes a top guiding sleeve 20, a bottom fixing sleeve 22 and a knocking stick 24. The cleaning system 200 is used for cleaning up plastic 29 in a nozzle 27 of an injection molding machine (not shown). The nozzle 27 includes a nozzle opening 28 and a through hole 26 connected with the nozzle opening 28. The plastic 29 is received in the through hole 26, and the through hole 26 defines a first central axis l. The top guiding sleeve 20 is configured for coupling with the bottom fixing sleeve 22. The bottom fixing sleeve 22 is configured for securely fixing and receiving the nozzle 27.

The bottom fixing sleeve 22 includes a receiving hole 222 for receiving the nozzle 27. The receiving hole 222 defines a second central axis l'. The second central axis l' coincides with the first central axis l of the through hole 26 of the nozzle 27.

The top guiding sleeve 20 includes a guiding hole 202 and a receiving portion 220. The receiving portion 220 includes a receiving cavity 204. The guiding hole 202 communicates with the receiving cavity 204, and the guiding hole 202 allows the knocking stick 24 to pass therethrough. The receiving cavity 204 communicates with the receiving hole 222 of the bottom fixing sleeve 22. One end of the bottom fixing sleeve 22 adjacent to the top guiding sleeve 20 is tightly received in the receiving cavity 204 of the top guiding sleeve 20. The guiding hole 202 defines a third central axis n, and the first central axis l of the through hole 26 coincides with the third central axis n of guiding hole 202.

The knocking stick 24 is movable along the guiding hole 202 of the top guiding sleeve 20 such that the knocking stick 24 strikes the plastic 29 in a direction along the first central axis l of the through hole 26 of the nozzle 27.

In operation, the knocking stick 24 is guided through the guiding hole 202 and the receiving cavity 204 of the top guiding sleeve 20 and impacts the plastic 29. The knocking stick 24 can be guided by the guiding hole 202 of the top guiding sleeve 20, such that the knocking stick 24 will impact the plastic 29 only in a direction along the first central axis l of the through hole 26 of the nozzle 27, such that the nozzle gate 28 will not be damaged by the knocking stick 24. In the present embodiment, the end of the knocking stick 24 that is inserted in the bottom fixing sleeve 22 is cone-shaped which makes it easier to loosen the plastic 29. The knocking stick 24 can be made of copper or other metallic materials. The nozzle 27 can be made of stainless steel or other metallic materials with highly rigidity. Such that when the copper knocking stick 24 with less rigidity than the stainless steel nozzle 27 impacts the nozzle gate 28, it will not damage the nozzle gate 28.

The receiving portion 220 of the top guiding sleeve 20 can further include an inner screw arranged on the inner wall thereof. One end of the bottom fixing sleeve 22 received in the receiving cavity 204 of the top guiding sleeve 20 can further include an outer screw arranged on the outer wall thereof. The top guiding sleeve 20 and the bottom fixing sleeve 22 can be threadedly coupled to each other via the inner screw and the outer screw.

Figure 2:
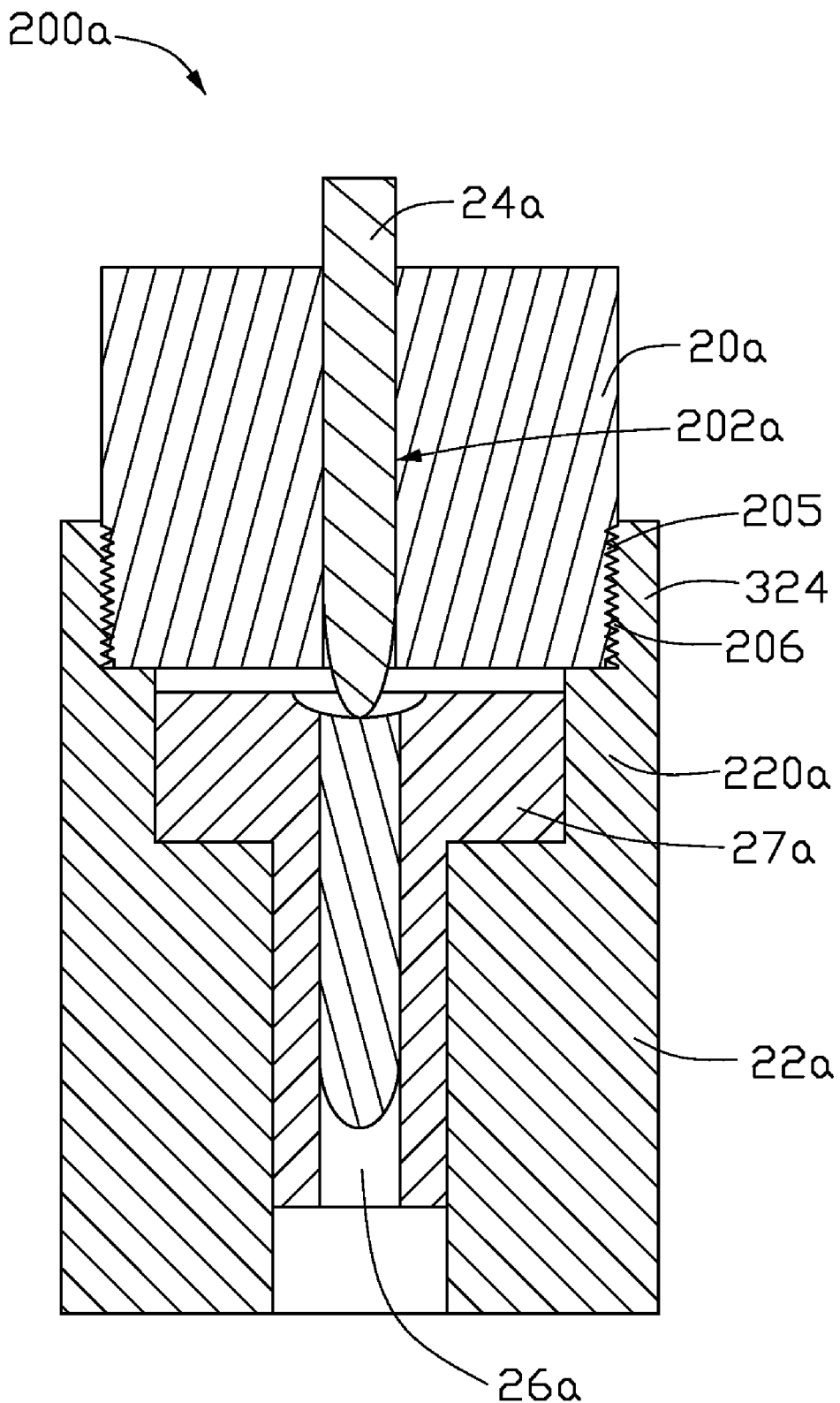
FIG. 2 is a cross-sectional view of a cleaning system according to a second embodiment.

Referring to FIG. 2, a cleaning system 200a, in accordance with a second embodiment, is provided. The cleaning system 200a is similar to the cleaning system 200 except that the bottom fixing sleeve 22a of the cleaning system 200a includes an annular protrusion 324 protruding from an end of the bottom fixing sleeve 22a adjacent to the top guiding sleeve 20a. The bottom fixing sleeve 22a includes a receiving portion 220a. The diameter of the annular protrusion 324 is larger than that of the receiving portion 220a. The top bottom guiding sleeve 20a includes a guiding hole 202a that can let the knocking stick 24a pass through. Outer screw threads 205 is arranged on the outer wall of the end of the top guiding sleeve 20a nearer to the bottom fixing sleeve 22a, and inner screw threads 206 is arranged on the inner wall of the annular protrusion 324 of the bottom fixing sleeve 22a, such that the inner screw threads 206 is coupled with the outer screw threads 205 to make the top guiding sleeve 20a and the bottom fixing sleeve 22a be tightly fixed to each other. The central axis of the guiding hole 202a aligns with the central axis of the through hole 26a.

Figure 3:
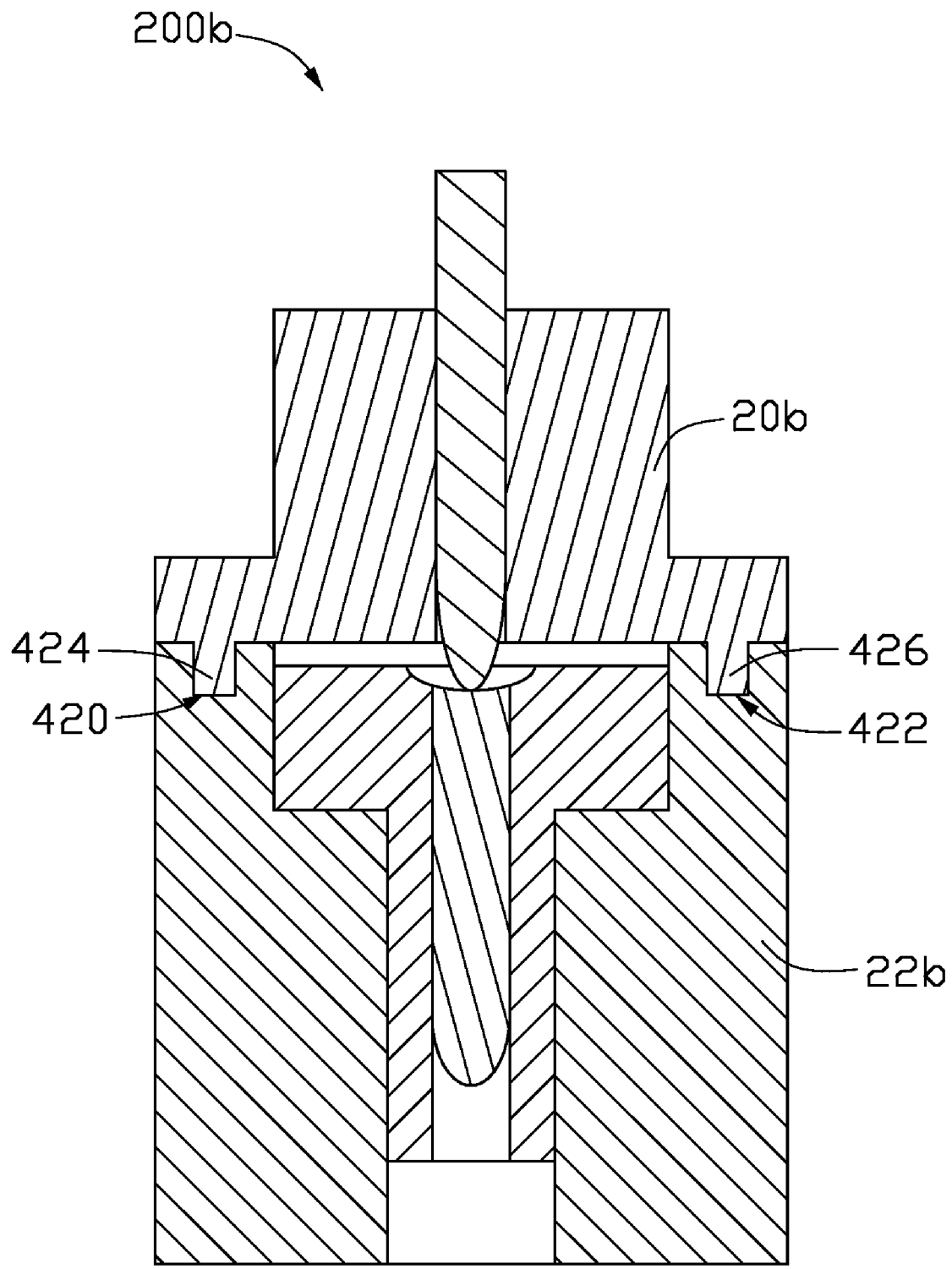
FIG. 3 is a cross-sectional view of a cleaning system according to a third embodiment.

Referring to FIG. 3, a cleaning system 200b, in accordance with a third embodiment, is provided. The cleaning system 200b is similar to the cleaning system 200 except that the bottom fixing sleeve 22b of the cleaning system 200b includes two flutes 420, 422 correspondingly arranged on an end of the bottom fixing sleeve 22b nearer to the top guiding sleeve 20b. The top guiding sleeve 20b of the cleaning system 200b includes two flanges 424, 426 correspondingly arranged on the end of the top guiding sleeve 20b nearer to the bottom fixing sleeve 22b. The two flanges 424, 426 are arranged correspondingly to the two flutes 420, 422 and are tightly received in the two flutes 420, 422, thus the top guiding sleeve 20b is tightly fixed to the bottom fixing sleeve 22b. It should be understood that the number of the flutes or the flanges can be more than two.

Figure 4:
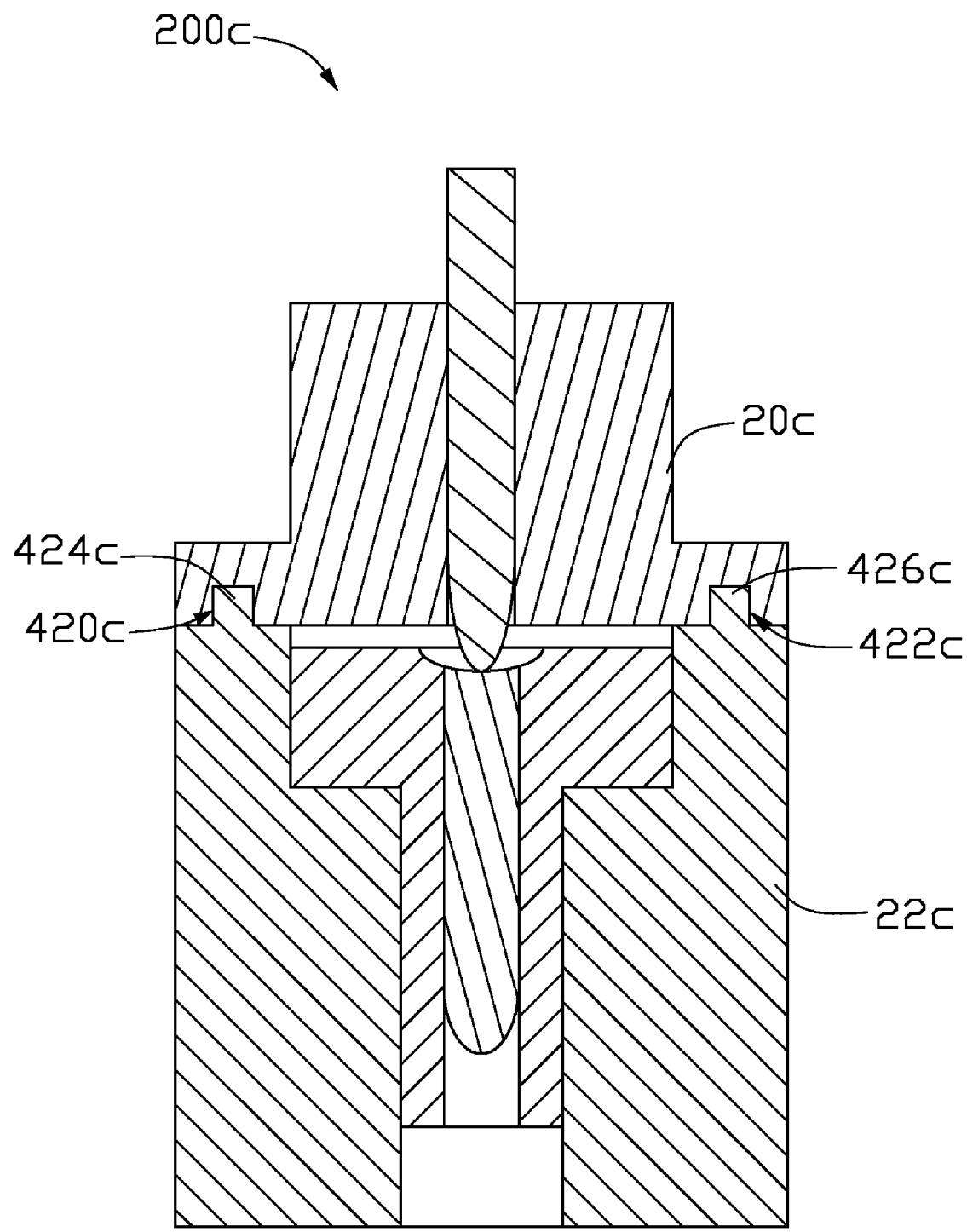
FIG. 4 is a cross-sectional view of a cleaning system according to a fourth embodiment.
Figure 5:
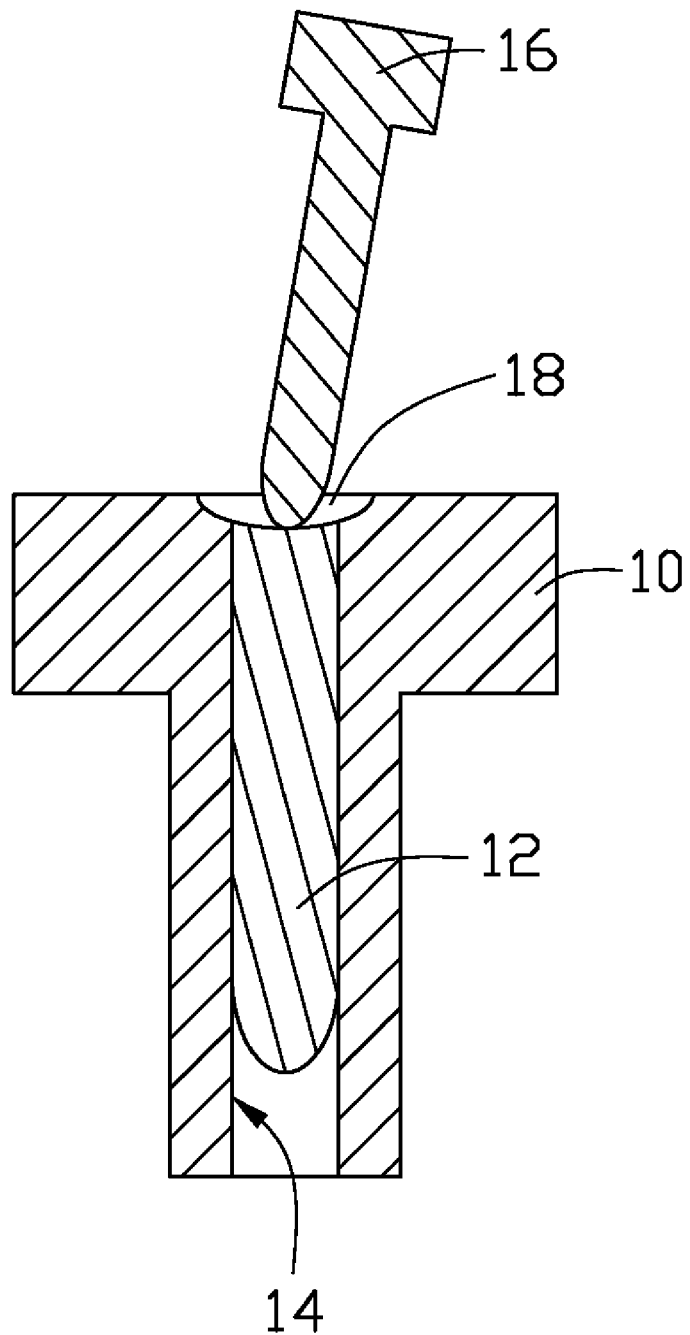
FIG. 5 is a cross-sectional view of a typical nozzle of a molding apparatus.

Referring to FIG. 4, a cleaning system 200c, in accordance with a fourth embodiment, is provided. The cleaning system 200c is similar with the cleaning system 200b except that the top guiding sleeve 20c of the cleaning system 200c includes two flutes 420c, 422c correspondingly arranged on the end of the top guiding sleeve 20c that nearer to the bottom fixing sleeve 22c. The bottom fixing sleeve 22c of the cleaning system 200c includes two flanges 424c, 426c correspondingly arranged on the end of the bottom fixing sleeve 22c that nearer to the top guiding sleeve 20c. The two flanges 424c, 426c are arranged correspondingly to the two flutes 420c, 422c and are tightly received in the two flutes 420c, 422c, thus the top guiding sleeve 20c is tightly fixed to the bottom fixing sleeve 22c. It should be understood that the number of the flutes or the flanges can be more than two.

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A cleaning system, used for cleaning plastic in a nozzle of a molding apparatus, the nozzle comprising a nozzle opening and a through hole connected with the nozzle opening, the plastic being received in the through hole, the through hole defining a first central axis, the cleaning system comprising:
    a bottom fixing sleeve configured for securely fixing the nozzle, and comprising two flutes;
    a top guiding sleeve configured for coupling with the bottom fixing sleeve, the top guiding sleeve comprising a guiding hole defined therein and two flanges correspondingly arranged on an end of the top guiding sleeve nearer to the bottom fixing sleeve; and
    a knocking stick being movable along the guiding hole of the top guiding sleeve such that the knocking stick strikes the plastic in a direction along the first central axis of the through hole of the nozzle;
    wherein the two flutes of the bottom fixing sleeve are correspondingly arranged on an end of the bottom fixing sleeve nearer to the top guiding sleeve, the two flanges are arranged correspondingly to the two flutes and being tightly received in the two flutes.

2. The cleaning system of claim 1, wherein the bottom fixing sleeve comprises a receiving hole for receiving the nozzle, the receiving hole defining a second central axis, the second central axis of the receiving hole aligning with the first central axis of through hole of the nozzle.

3. The cleaning system of claim 1, wherein the guiding hole defines a third central axis, and the first central axis of the through hole coincides with the third central axis of guiding hole.

4. The cleaning system of claim 1, wherein one end of the knocking stick nearer to the bottom fixing sleeve is cone-shaped.

5. The cleaning system of claim 1, wherein the knocking stick is made of copper.

6. A cleaning system, used for cleaning plastic in a nozzle of a molding apparatus, the nozzle comprising a nozzle opening and a through hole connected with the nozzle opening, the plastic being received in the through hole, the through hole defining a first central axis, the nozzle further comprising an enlarged portion at end thereof, the cleaning system comprising:
    a bottom fixing sleeve configured for securely fixing the nozzle, the bottom fixing sleeve comprising an enlarged recessed portion at an end thereof and a receiving hole in communication with the recessed portion, the recessed portion being adapted to receive the enlarged portion of the nozzle;
    a top guiding sleeve configured for coupling with the bottom fixing sleeve, the top guiding sleeve comprising a guiding hole defined therein, the enlarged portion of the nozzle being fixed between the bottom fixing sleeve and the top guiding sleeve when they are coupled to each other; and
    a knocking stick being movable along the guiding hole of the top guiding sleeve, such that the knocking stick strikes the plastic in a direction along the first central axis of the through hole of the nozzle.

7. The cleaning system of claim 6, wherein the guiding hole defines a third central axis, and the first central axis of the through hole coincides with the third central axis of guiding hole.

8. The cleaning system of claim 7, wherein the receiving hole defining a second central axis, the second central axis of the receiving hole aligning with the first central axis of through hole of the nozzle.

9. The cleaning system of claim 6, wherein the top guiding sleeve comprises a receiving portion which includes a receiving cavity, the guiding hole of the top guiding sleeve communicating with the receiving cavity, the receiving cavity tightly receiving an end of the bottom fixing sleeve nearer to the top guiding sleeve.

10. The cleaning system of claim 6, wherein the bottom fixing sleeve comprises an annular protrusion that protrudes from an end of the bottom fixing sleeve nearer to the top guiding sleeve, an outer screw is arranged on an outer wall of an end of the top guiding sleeve nearer to the bottom fixing sleeve, an inner screw is arranged on an inner wall of the annular protrusion of the bottom fixing sleeve, the inner screw couples with the outer screw to make the top guiding sleeve and the bottom fixing sleeve be tightly fixed to each other.

11. The cleaning system of claim 6, wherein the bottom fixing sleeve comprises two flutes arranged on an end of the bottom fixing sleeve nearer to the top guiding sleeve, the top guiding sleeve comprises two flanges arranged on an end of the top guiding sleeve nearer to the bottom fixing sleeve, the two flanges are arranged correspondingly to the two flutes and are tightly received in the two flutes.

12. The cleaning system of claim 6, wherein the bottom fixing sleeve comprises two flanges arranged on an end of the bottom fixing sleeve nearer to the top guiding sleeve, the top guiding sleeve comprises two flutes arranged on an end of the top guiding sleeve nearer to the bottom fixing sleeve, the two flanges are arranged correspondingly to the two flutes and are tightly received in the two flutes.

* * * * *